US012156844B2

(12) United States Patent
Shen et al.

(10) Patent No.: US 12,156,844 B2
(45) Date of Patent: Dec. 3, 2024

(54) POWER ASSISTIVE DEVICE FOR STAIR ASCENT AND DESCENT

(71) Applicant: THE BOARD OF TRUSTEES OF THE UNIVERSITY OF ALABAMA, Tuscaloosa, AL (US)

(72) Inventors: Xiangrong Shen, Tuscaloosa, AL (US); Md Rayhan Afsar, Tuscaloosa, AL (US); Md Rejwanul Haque, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 765 days.

(21) Appl. No.: 17/319,152

(22) Filed: May 13, 2021

(65) Prior Publication Data

US 2021/0353495 A1 Nov. 18, 2021

Related U.S. Application Data

(60) Provisional application No. 63/024,132, filed on May 13, 2020.

(51) Int. Cl.

*A61H 3/00* (2006.01)
*E04F 11/18* (2006.01)

(52) U.S. Cl.

CPC ............ *A61H 3/00* (2013.01); *E04F 11/1863* (2013.01); *A61H 2003/001* (2013.01); *A61H 2003/006* (2013.01); *A61H 2003/007* (2013.01); *A61H 2201/0126* (2013.01); *A61H 2201/1215* (2013.01); *A61H 2201/1652* (2013.01);

(Continued)

(58) Field of Classification Search

CPC . E04F 11/1863; A61H 3/00; A61H 2003/001; A61H 2003/006; A61H 2003/007; A61H 2201/0126; A61H 2201/1215; A61H 2201/1652; A61H 2201/1664; A61H 2201/5028; A61H 2201/5079

See application file for complete search history.

(56) References Cited

U.S. PATENT DOCUMENTS 5,269,227 A * 12/1993 Warren .................... B66B 9/08 105/29.1
5,363,771 A * 11/1994 Warren .................... B66B 9/08 105/72.2

(Continued)

FOREIGN PATENT DOCUMENTS

CN 109205437 1/2019

OTHER PUBLICATIONS

Lawler, K., Aging in Place: Coordinating Housing and Health Care Provision for America's Growing Elderly Population. Cambridge, MA: Joint Center for Housing Studies of Harvard University. 2001. 64 pages.

(Continued)

*Primary Examiner* — Andrew J Triggs

(74) *Attorney, Agent, or Firm* — Meunier Carlin & Curfman LLC

(57) ABSTRACT

An assistive device for stair-climbing assistance includes a powered rail-sliding platform that assists its user through a unique human interface. The device provides powered assistance (a gentle pulling force) and protection (through a safety belt) to help users climb or descend stairs.

20 Claims, 8 Drawing Sheets

(52) U.S. Cl.
CPC ................ *A61H 2201/1664* (2013.01); *A61H 2201/5028* (2013.01); *A61H 2201/5079* (2013.01)

(56) References Cited

U.S. PATENT DOCUMENTS

| | | | | | |
|---|---|---|---|---|---|
| 5,522,322 | A * | 6/1996 | Warren | E04F 11/1863 5/81.1 R |
| 10,066,398 | B1 * | 9/2018 | Guerrero | A61H 3/00 |
| 10,077,560 | B2 * | 9/2018 | Medbø | E04F 11/1863 |
| 2006/0242917 | A1 | 11/2006 | Usherovich | |
| 2006/0243112 | A1 * | 11/2006 | Debrunner | B66B 9/0846 83/455 |
| 2014/0374681 | A1 * | 12/2014 | Brindamour | E04F 11/1863 256/65.16 |
| 2016/0017611 | A1 * | 1/2016 | Douglas | H04W 4/14 187/201 |
| 2018/0347206 | A1 * | 12/2018 | Ho | E04F 11/1863 |
| 2021/0353495 | A1 * | 11/2021 | Shen | A61H 3/00 |

OTHER PUBLICATIONS

Cook, C.C., M.H. Yearns, and P. Martin, Aging in place: Home modifications among rural and urban elderly. Housing and Society, 2005. 32(1): p. 85-106.

Organization, W.H., Global age-friendly cities: A guide. 2007: World Health Organization. 82 pages.

Farber, N., D. Shinkle, J. Lynott, W. Fox-Grage, and R. Harrell, Aging in place: A state survey of livability policies and practices. 2011. 84 pages.

Startzell, J.K., D.A. Owens, L.M. Mulfinger, and p. R. Cavanagh, Stair negotiation in older people: a review. Journal of the American Geriatrics Society, 2000. 48(5): p. 567-580.

Hemenway, D., S.J. Solnick, C. Koeck, and J. Kytir, The incidence of stairway injuries in Austria. Accident Analysis & Prevention, 1994. 26(5): p. 675-679.

Cooper, R.A., M.L. Boninger, R. Cooper, A.R. Dobson, J. Kessler, M. Schmeler, and S.G. Fitzgerald, Use of the Independence 3000 IBOT Transporter at home and in the community. The journal of spinal cord medicine, 2003. 26(1): p. 79-85.

Sugahara, Y., N. Yonezawa, and K. Kosuge. A novel stair-climbing wheelchair with transformable wheeled four-bar linkages. in 2010 IEEE/RSJ International Conference on Intelligent Robots and Systems. 2010. IEEE.

Quaglia, G., W. Franco, and R. Oderio, Wheelchair. q, a motorized wheelchair with stair climbing ability. Mechanism and Machine Theory, 2011. 46(11): p. 1601-1609.

Scewo AG. Scewo. Available from: https://scewo.ch/en/.

EZ-STEP. Portable, unique, one of a kind stair climbing aid! Available from: http://www.ez-step.com/home.html.

StairSteady. A Step Towards Independence. [cited Apr. 3, 2020]; Available from: https://stairsteady.net/.

Axtell, Lois A., and Y. Lynn Yasuda. "Assistive devices and home modifications in geriatric rehabilitation." Clinics in geriatric medicine 9.4 (1993): 803-821.

Kaye, et al., Mobility Device Use in the United States. 2000.

Hedman, G. E. "Travel along stairs by individuals with disabilities: a summary of devices used during routine travel and travel during emergencies." Pedestrian and Evacuation Dynamics. Springer, Boston, MA, 2011. 109-119.

* cited by examiner

POWER ASSISTIVE DEVICE FOR STAIR ASCENT AND DESCENT

CROSS REFERENCE TO RELATED APPLICATIONS

This application is a non-provisional application of and claims priority to U.S. Application Ser. No. 63/024,132, filed May 13, 2020, which is hereby incorporated by this reference in its entirety as if fully set forth herein.

BACKGROUND

Field

Embodiments of the present invention relate to a motorized device to help guide and support a person climbing stairs, specifically a low profile powered assistive device.

Background

With the rapid aging of the U.S. population, providing older adults with safe and comfortable living environments is becoming a more and more important topic for the senior care community. Compared with institutional living facilities (such as nursing homes), an older adult's own home is an overwhelmingly preferred environment for living and growing older [1, 2]. As such, aging-in-place, the practice of aging in one's own home and community, has been actively studied and promoted by elderly care-related federal agencies and organizations in recent years [3, 4]. Such practice, however, also faces multiple obstacles in reality. A major obstacle, as identified in multiple studies, is the difficulty in going up and down stairs [2], which is one of the most challenging and hazardous activities in an older adult's daily life [5]. Falls on stairs are a leading cause of accidental death, according to data from the National Safety Council [6]. Nonfatal injuries on stairs are also common among older adults, and the incidence rate increases substantially with age [7]. Due to the significant challenge posed by stairs, many older adults have to move out of their multi-story homes, despite their strong preference of staying in their own home when growing older.

Stairs are essentially a special type of apparatus to allow people to move between different levels. If the use of stairs is undesirable, the most common alternative is elevators. However, elevators are expensive to install, operate, and maintain. Elevators are also space intensive. Both are overwhelming problems that make the use of elevators impossible in most multi-level homes. Alternative to elevators, stair lifts are also gaining increasing adoption in residential buildings. These mechanical lifting devices are able to lift people up and down stairs in a seated or standing position. Compared with elevators, stair lifts do not require dedicated vertical space, and thus are easier to install. However, as stair lifts are mounted in the staircases, they take up valuable space, making the stairways narrow and affecting the stair use by other individuals. Furthermore, stair lift users tend to develop a reliance on these devices, essentially giving up their own stair climbing capability.

In recent years, a variety of assistive devices have been developed to help mobility-challenged individuals in stair climbing. Some of them are sophisticated devices that incorporate stair climbing-related design features into mobility platforms. A typical example is iBOT, a stair-climbing wheelchair that has two sets of powered wheels that rotate with respect to each other when climbing up the stairs [8]. Similar reconfigurable driving mechanisms were utilized in other stair-climbing wheelchairs [9, 10]. Track-based locomotion has also been attempted (e.g. the Scewo wheelchair [11]). Despite their stair-climbing capability, the stair-climbing wheelchairs suffer from a number of problems common among wheelchairs, e.g., being heavy and bulky, difficulty of maneuvering in home environments, and the users' lack of muscle use and bone load-bearing. In addition to the powered devices, simple unpowered mechanical devices have also been developed, for example, the EZ-Step stair-climbing cane, which has a rectangular base that allows a user to step on when placed on a stair, essentially turning regular stairs into half stairs [12]. An arguably more innovative device is the StairSteady, a supporting handle that slides on a fixed handrail and locks its position to stabilize the user when a sudden load is applied [13]. Due to the mechanically passive nature, these unpowered devices are unable to assist the users' upward movement in stair climbing, which limits their efficacy in use.

Compared with level-ground walking, stair climbing comes with a greater level of difficulty and risk associated with the discontinuous surface of locomotion, as well as the substantial elevation of the center of mass. Existing mobile assistive devices (i.e., stair-climbing wheelchairs) rely on the ground-contact frictional force to propel the upward motion. Due to the frictional force's inherent uncertainty and sensitivity to the environmental conditions, such working principle's fundamental reliability issue and safety concern cannot be easily addressed.

BRIEF SUMMARY OF THE DISCLOSURE

Accordingly, the present invention is directed to a power assistive device for stair ascent and descent that obviates one or more of the problems due to limitations and disadvantages of the related art.

In accordance with the purpose(s) of this invention, as embodied and broadly described herein, this invention, in one aspect, relates to a device for assisting a user in motion in a system comprising at least an upper rail and a support rail parallel to the upper rail, the device comprising a mobile platform; a first engagement mechanism attached to the mobile platform and having at least one contact means for contacting a surface of the upper rail; a second engagement mechanism attached to the mobile platform having a contact means having a surface complementary to a driving surface of the support rail; a human interface for grasping by the user; and a motor for causing relative motion of the contact means with respect to the driving surface.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the power assistive device for stair ascent and descent, as well as the structure and operation of the various embodiments of the power assistive device for stair ascent and descent, are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate the power assistive device for stair ascent and descent. Together with the description, the figures further serve to explain the principles of the power assistive device for stair ascent and descent described herein and thereby enable a person skilled in the pertinent art to make and use the power assistive device for stair ascent and descent.

DETAILED DESCRIPTION

Reference will now be made in detail to embodiments of the power assistive device for stair ascent and descent with reference to the accompanying figures The same reference numbers in different drawings may identify the same or similar elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The power assistive device disclosed herein addresses the problem associated with prior devices. Instead of interacting with the discontinuous stair surfaces, a user support slides on two continuous, wall-mounted rails. Such simple mode of operation enables the use of continuously rotating driving mechanism to reduce the system complexity and cost. Furthermore, a tooth-based driving mechanism may be utilized to provide a reliable interaction and reduce the possibility of slipping.

Figure 1:
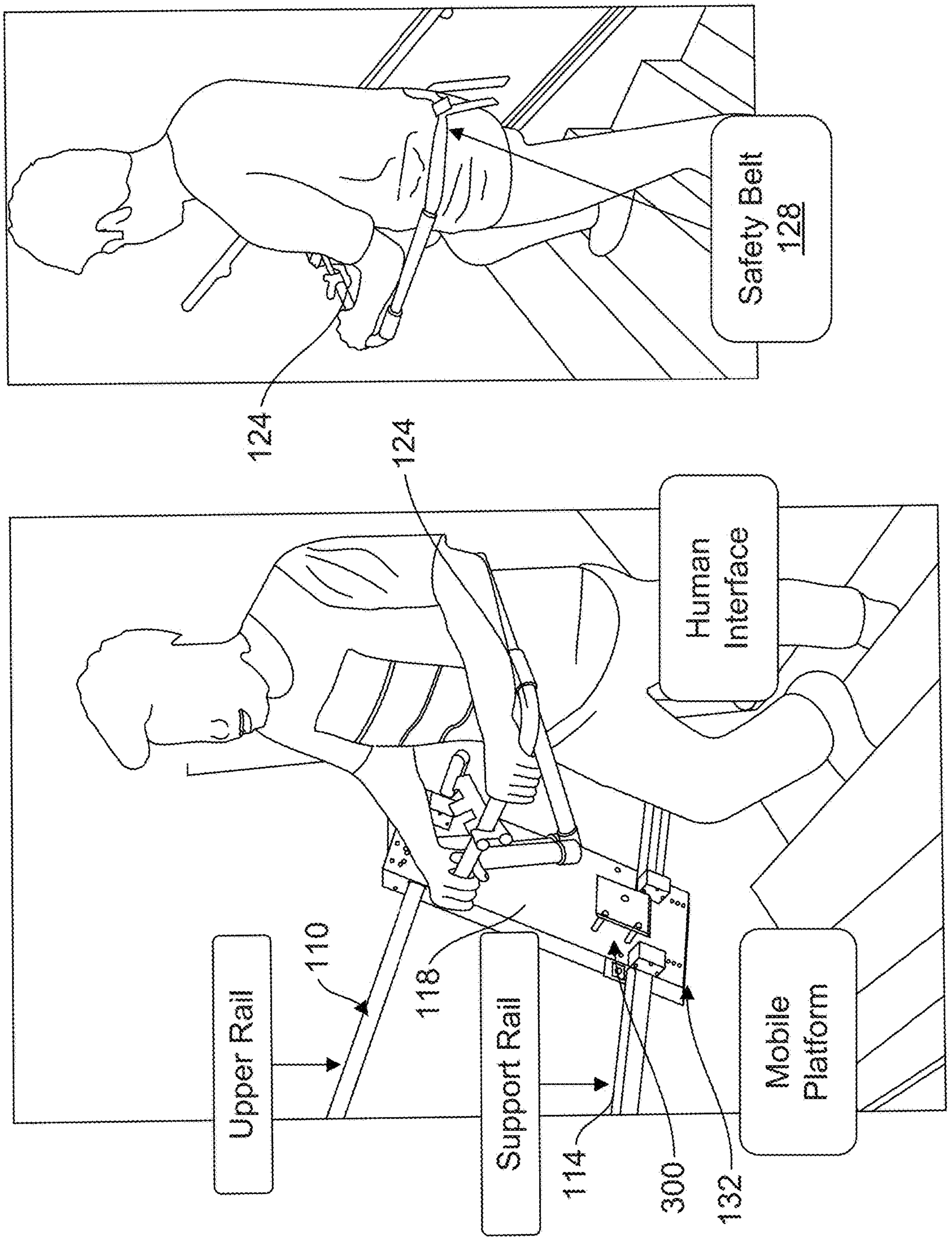
FIG. 1 shows a prototype of a power assistive device for stair ascent according to principles described herein.

An embodiment of a power assistive device for stair ascent and descent system according to principles described herein is shown in FIG. 1 and includes an upper rail 110, a support rail 114, a mobile platform 132, and a human interface 124 (FIG. 1). The upper rail 110 may be a simple tubular rail mounted to the wall in the staircase. In most cases, the existing handrail in the staircase can be used directly or slightly modified to function as the upper rail 110. The support rail 114 is a second rail to be mounted below and in parallel with the upper rail 110. In addition to providing support to the mobile platform 132, it also functions as the mounting base for a linear component of a driving system, which may be a tooth-based driving system.

With the upper rail 110 and the support rail 114 in place (e.g., mounted on a wall adjacent the staircase for which the device is to be used), a mobile platform 132 travels or slides with the upper and support rail 114*s* as guides. For example, the mobile platform 132 may touch, engage, or abut each of the rails (upper rail 110, support rail 114) via a mechanism or mechanisms to move or slide in the direction of motion of the user 100. An example mechanism for traversing on the upper rail 110 and an example mechanism for traversing on the support rail 114 are shown in FIG. 2A.

Figure 2A:
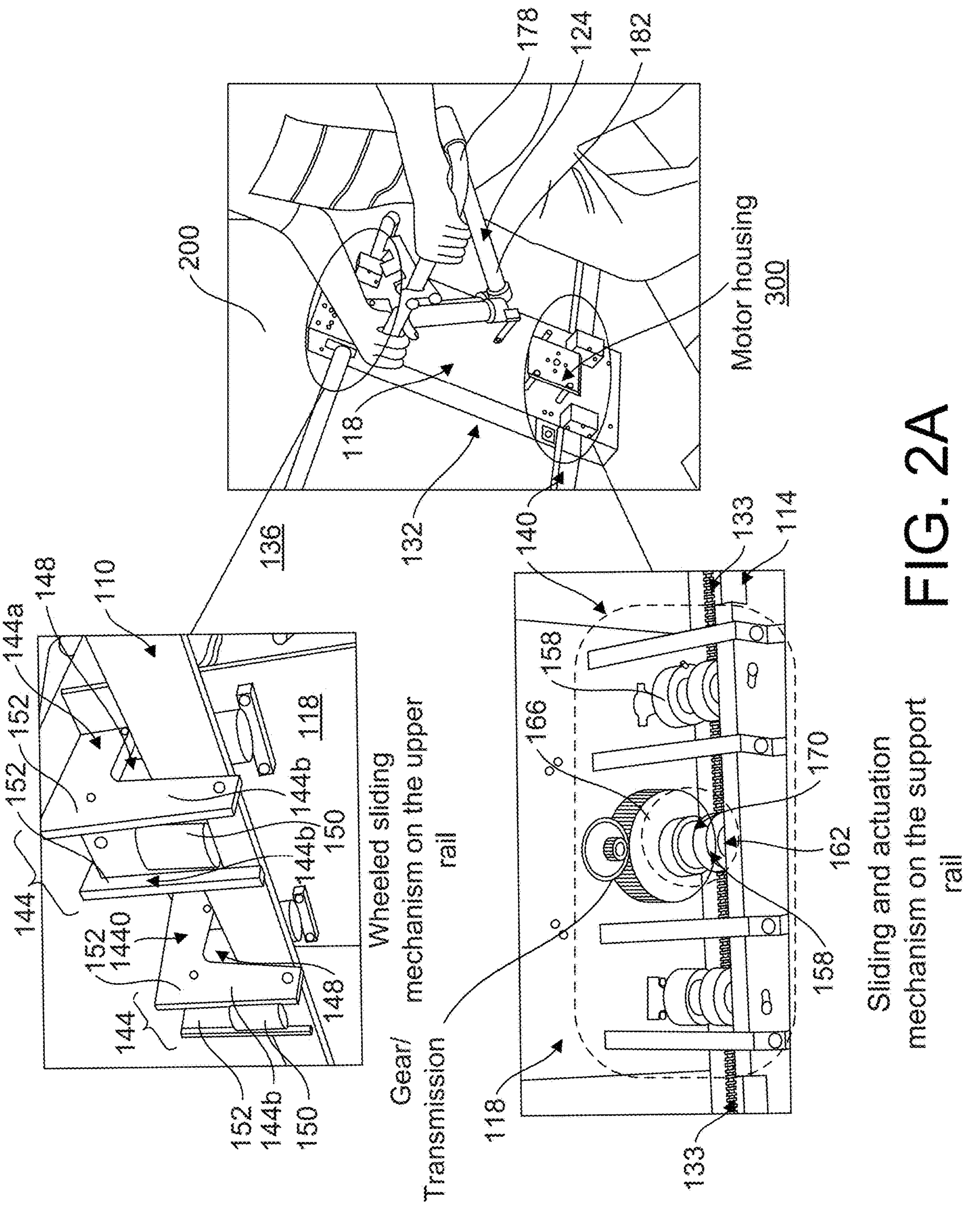
FIGS. 2A and 2B show components of a prototype of a power assistive device for stair ascent according to principles described herein.

As illustrated in FIG. 2A, the mobile platform 132 may include a plate 118 or frame, an upper engagement mechanism 136 compatible with the upper rail 110 and a lower engagement mechanism 140 compatible with the support rail 114. While illustrated as being a solid plate, the plate 118 may be a frame suitable for supporting the upper engagement mechanism and the lower mechanism as contemplated herein. As illustrated, the example upper engagement mechanism 136 includes at least one bracket or clamp 144. The bracket or clamp 144 extends from the plate/mobile platform 118/132. As shown, each bracket or clamp 144 includes two bracket frames 152, each of which comprises a lateral arm 144*a* and a distal arm 144*b*. Each lateral arm 144*a* extends from the plate 118 in a direction substantially normal from the plate 118 and each distal arm 144*b* extends from an end of the lateral arm 144*a* distal from the plate 118, in a direction substantially perpendicular to the lateral arm 144*a*, although such perpendicular orientation is not required. A roller or wheel 148 is mounted on or operatively coupled to the lateral arm 144*a* or the distal arm 144*b* such that the surface of the roller or wheel 148 may touch a surface of the upper rail 110 and roll along the surface of the upper rail 110. An additional roller or wheel 150 may be mounted on or operatively couple to the other of the lateral arm 144*a* or the distal arm 144*b* such that the surface of the additional roller or wheel may touch another surface of the upper rail 110 and roll along another surface of the upper rail 110. The figure illustrates two brackets or clamps 144, but in practice, more or fewer may be used. As illustrated, each lateral arm 144*a* may be a plate, but such shape is not necessary similarly each distal arm 144*b* may be a plate but such shape is not necessary. For each bracket 144 comprising two frames, the roller or wheel 148 is mounted between the two lateral arms 144*a* and the additional roller or wheel 150 is mounted between the two distal arms 144*b*. Although illustrated with the lateral arm 144*a* extending from the plate 118 above the upper rail 110, the lateral arm 144*a* may extend under the upper rail 110. Moreover, it may be possible to have wheel(s) or roller(s) at a side of the upper rail 110 without having a roller abut at the top or underside of the upper rail 110. It is also possible to have wheel(s) abut only the top of the upper rail 110 or underside of the upper rail 110 or both, with or without wheel(s) at the side of the upper rail. Thus, it is possible to have a wheel abut the top of the upper rail 110, a first side of the upper rail 110, a second side of the upper rail 110, and/or the underside of the upper rail 110 and still be within the spirit and scope of the present invention. Although the brackets 144 are described as having two bracket frames 152 joined together, the invention is not so limited and the bracket 144 may be a more unitary structure wherein the two bracket frames 152 may be integrally formed. In other words, the bracket 144 may include at least one wheel that rides on the upper rail and fall within the scope of the invention described herein.

As further illustrated in FIG. 2A, an example lower engagement mechanism 140 according to principles described herein includes at least one roller or wheel 158 on an axle 162 normal to the plate or frame 118. The wheel or roller 158 itself may include a toothed surface (not shown) to engage a complementary toothed surface 133 on or in the lower/support rail 114. As illustrated in FIG. 2A, the example lower engagement mechanism 140 includes a roller mechanism 166 comprising at least one roller 158 and a separate toothed gear 170, in this case, adjacent to at least one roller 158. As illustrated in FIG. 2A, the roller mechanism 166 may include two rollers 158 separated by the toothed gear 170, where the tooth pitch of the toothed gear is complementary to a toothed surface 132 extending along the length of the support rail 114. As illustrated, the roller mechanism 166 comprises the rollers 158 and the toothed gear mounted on a common axle 162 extending from the plate 118 in a direction substantially normal to the plate 118. As one can appreciate, the configuration of the rollers with respect to the toothed gear is not limited to that shown in FIG. 2A, so long as the rollers and the toothed gear move along the support rail 114 such that movement of the toothed gear with respect to the toothed surface causes the plate 118 to move in a desired direction with respect to the upper rail 110 and the support rail 114 to advance the device along the staircase. In toothed track and operability of the rollers is intended to be bidirectional such that the device may be used for ascent and descent of the staircase on which it is mounted. As shown in the lower left portion of FIG. 2A, more rollers 158 may be included in the lower engagement mechanism, and additional gears may be added to engage the toothed surface 133.

Figure 2B:
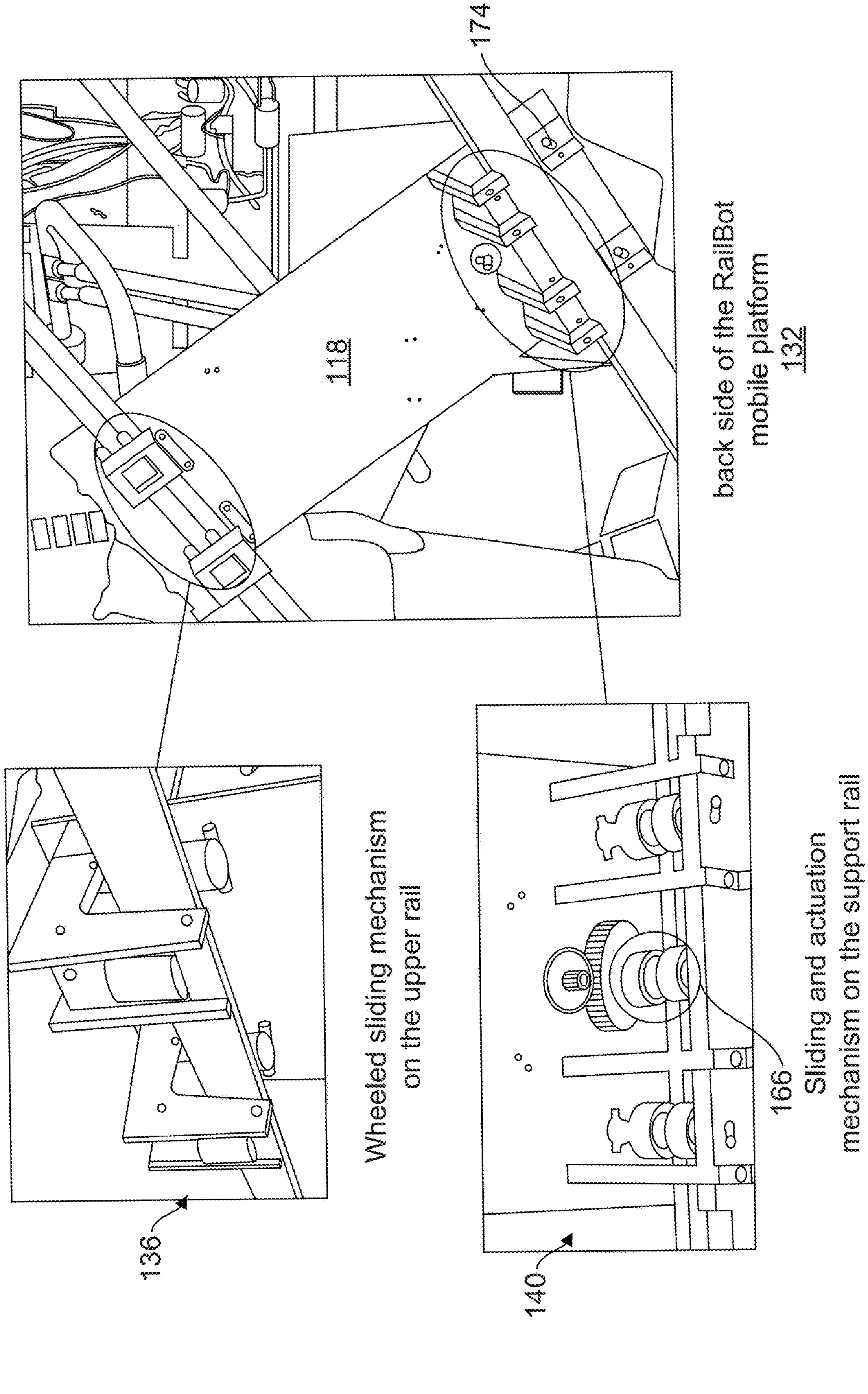

As illustrated in FIG. 2A, the plate 118 is mounted on the rails so that the upper and lower engagement mechanisms 136, 140 are on a side opposite from the user of the device, although the device is not so limited and different mounting is within the spirit and scope of the disclosure provided herein. A backside view of an example of the mobile platform 132 is shown in FIG. 2B. As can be seen in FIG. 2B, an underside bracket 174 on the lower engagement mechanism 140 may be provided to further stabilize the device in use.

Figure 3A:
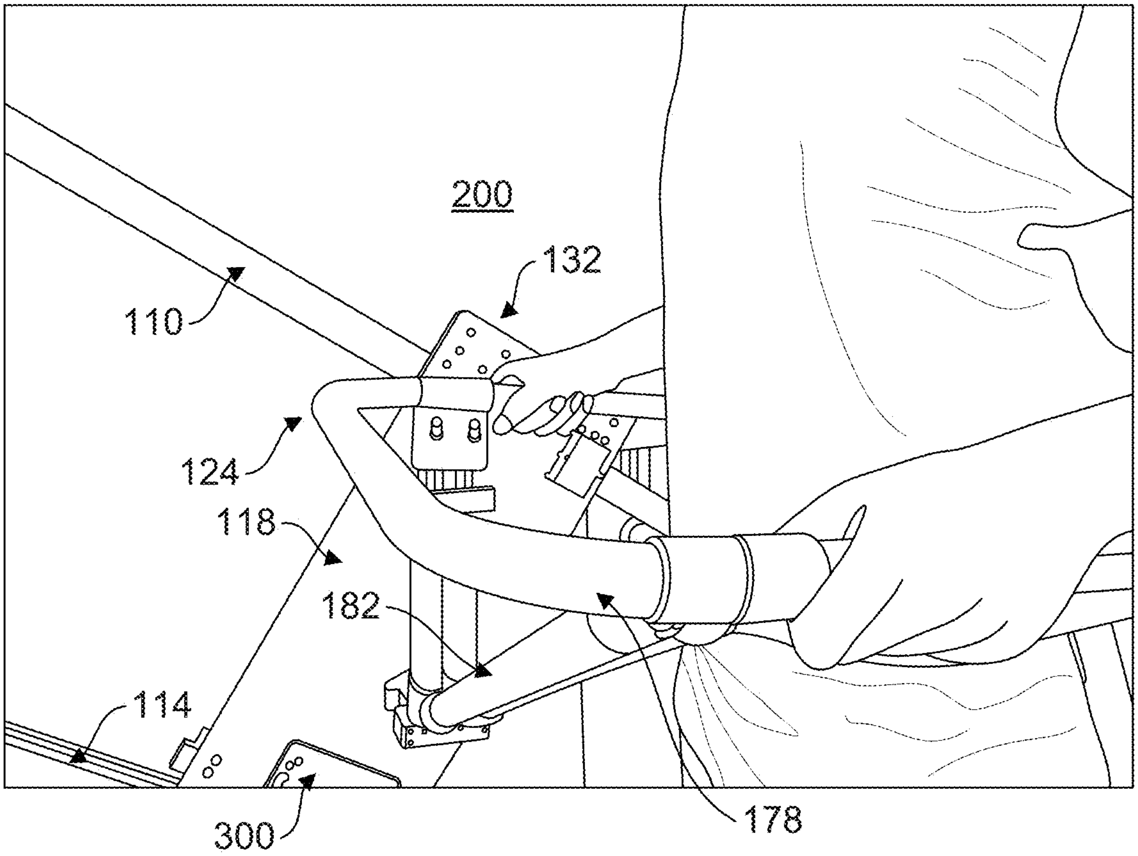
FIGS. 3A and 3B show examples of a human interface for the user of a power assistive device for stair ascent according to principles described herein.
Figure 3B:
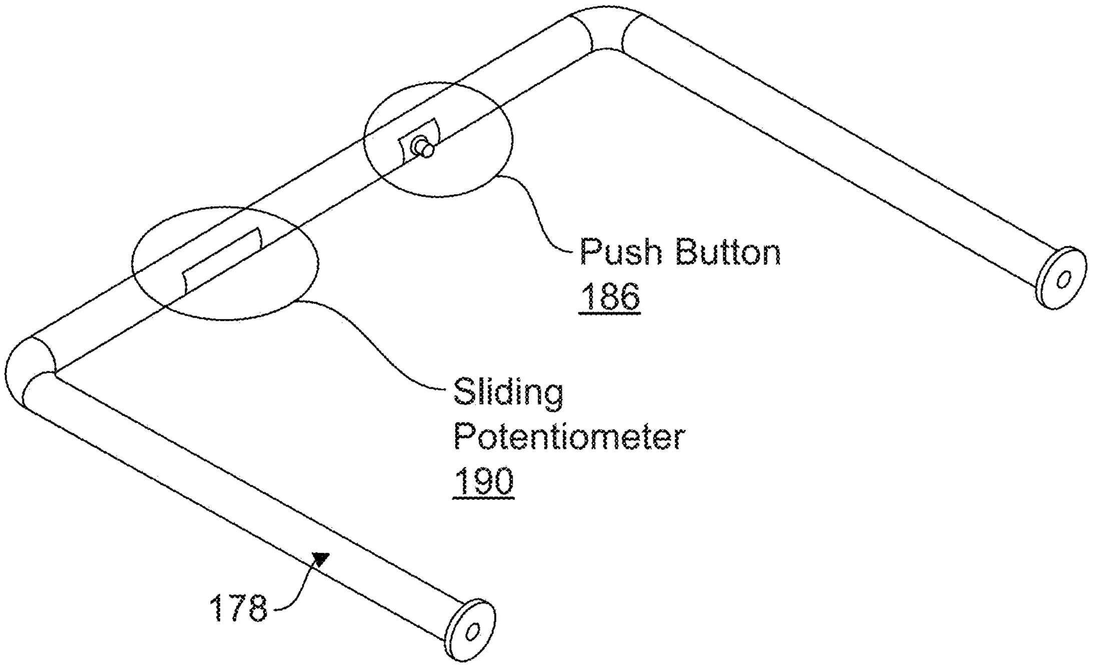

An example human interface 124 for the user is shown in FIGS. 3A and 3B. As illustrated, the interface may be a U-shaped grab bar 178 mounted to the mobile platform 132. The human interface 124, as shown, includes a supporting structure connecting the grab bar 178 with the mobile platform 132, which may be foldable toward the wall 200 on which the rails 110, 114 are mounted so as to be folded to a flat profile for space saving. As illustrated, the supporting structure 182 of the grab bar 178 is an angled (triangular strut), which may pivot to be folded against the mobile platform 132, but any design and foldability are possible. The grab bar 178 may also be folded so as to be reduce the profile of the device when not in use. While shown as being U-Shaped, or roughly rectangular in profile with rounded corners, the human interface 124 is not so limited and may be of any shape to be held by the user or engage with the user to allow the user to control the operation of the system. The grab bar 178 may comprise a shaped tube or may be of any suitable material and construction. Although not presently shown, the human interface 124 may include one or more horizontal grab bars having a profile compatible with grasping by the user of the horizontal grab bar. See U.S. Pat. No. 10,077,560, which functions differently from the present invention, but shows an example of a grab bar, such as a horizontal bar. The grab bar 178 structure may be such that there is no need to be reversed or flipped between an ascent and a descent position or it may be configured to be moveable between an ascent and a descent position depending on whether a user is ascending or descending stairs.

Figure 4A:
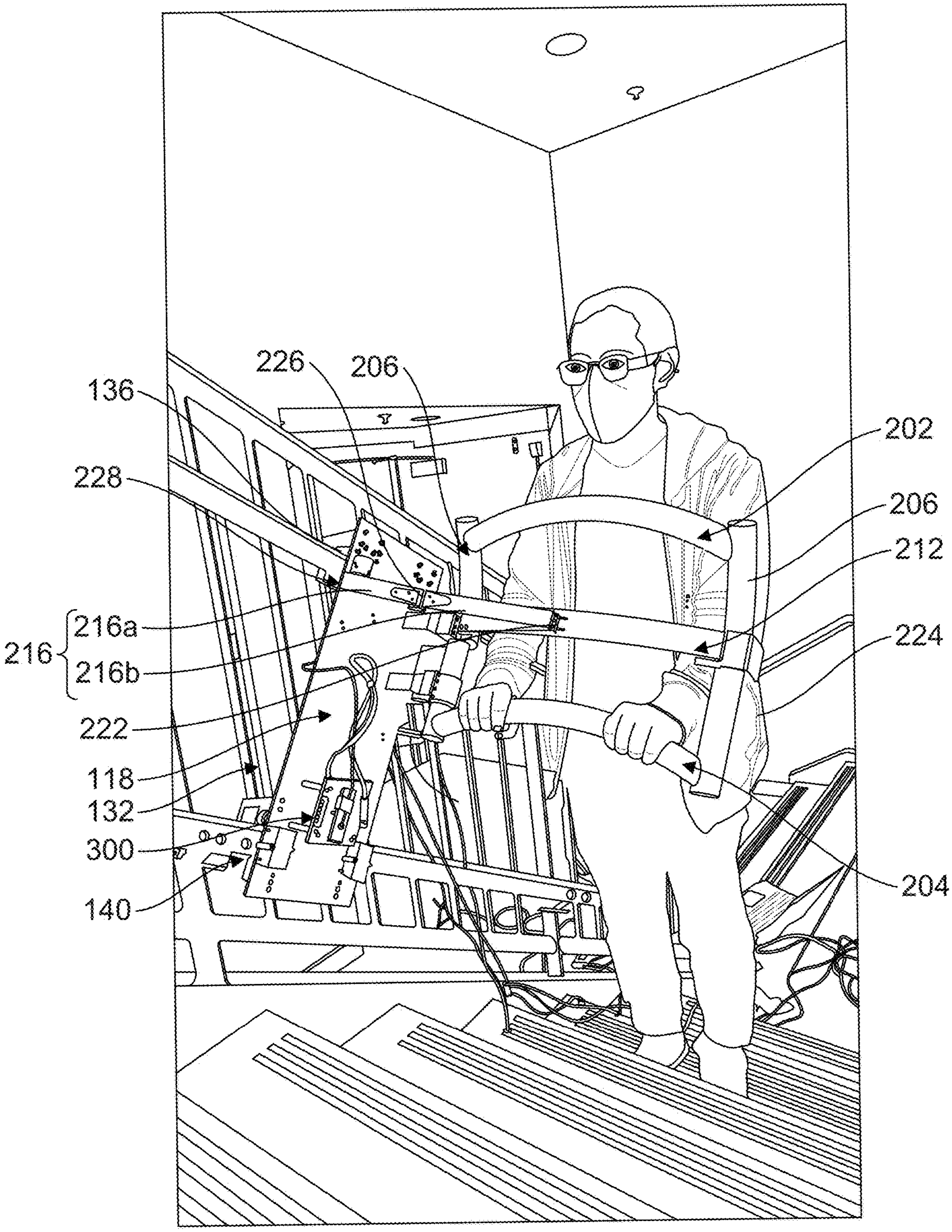
FIG. 4A shows a human interface with a user ascending a flight of stairs.
Figure 4B:
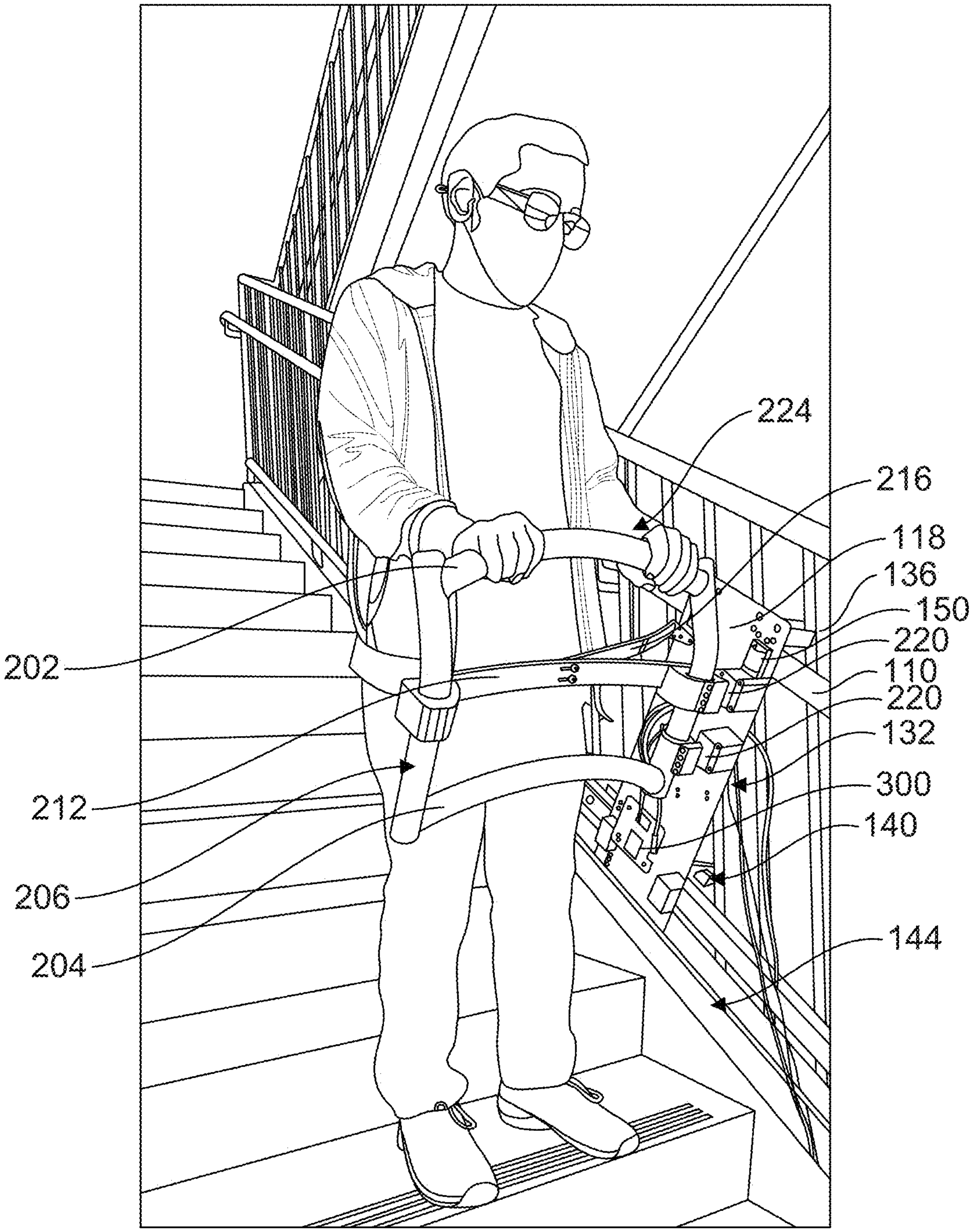
FIG. 4B shows the human interface of FIG. 4A with a user descending a flight of stairs.
Figure 4C:
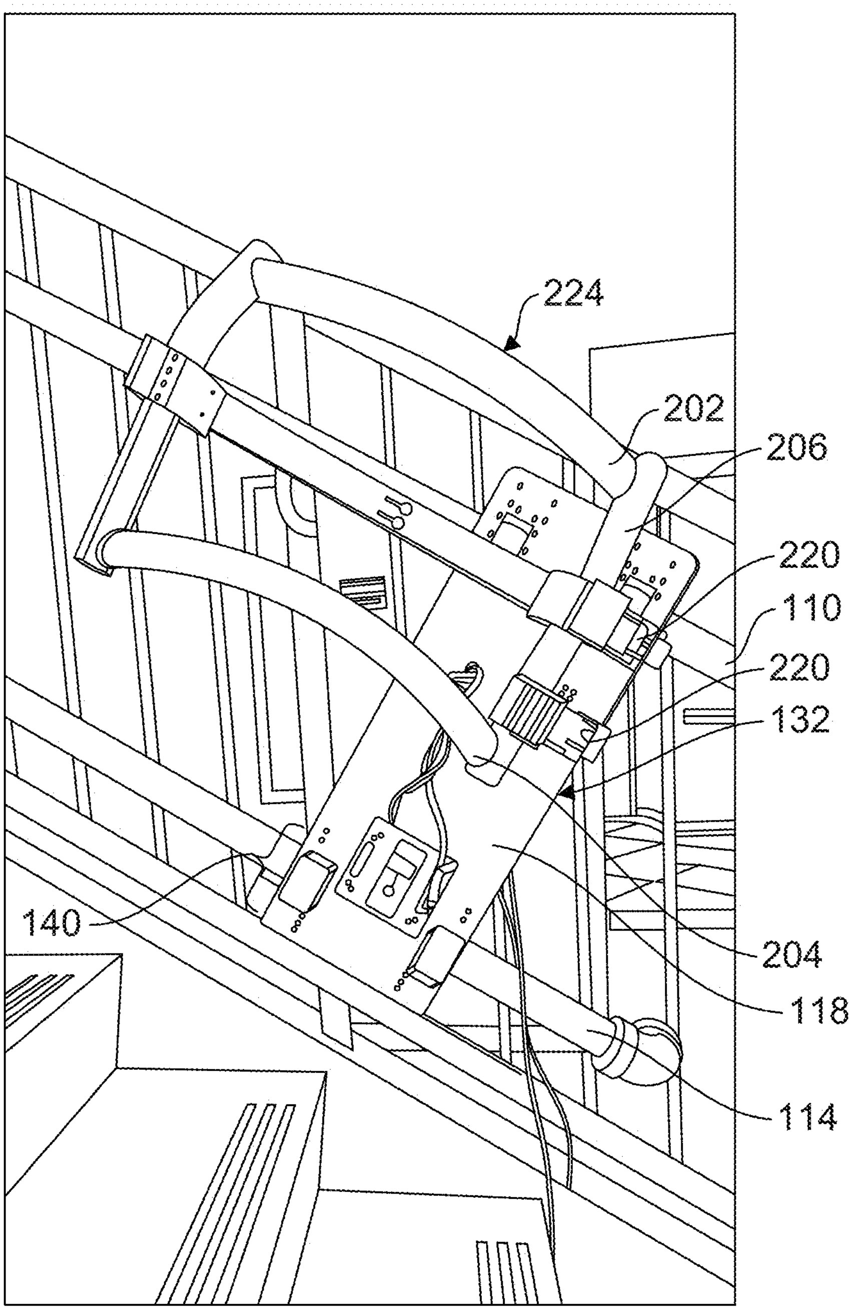
FIG. 4C shows the human interface of FIGS. 4A and 4B in a folded or stored position.

Another embodiment of a human interface 224 according to principles described herein is shown in FIGS. 4A, 4B and 4C. FIG. 4A shows a human interface 224 with a user ascending a flight of stairs. FIG. 4B shows the human interface 224 of FIG. 4A with a user descending a flight of stairs and FIG. 4C shows the human interface 224 of FIGS. 4A and 4B in a folded or stored position.

The human interface 224 illustrated in FIGS. 4A, 4B and 4C includes an upper bar 202, a lower bar 204, and two support bars 206 extending substantially in parallel from the upper bar 202 to the lower bar 204 substantially orthogonally to form an assembly having a generally rectangular profile, as illustrated in FIGS. 4A-C. Although not shown, the upper bar 202 and the lower bar 204 may be connected by a support bar 206 in any appropriate configuration, including a single support extending between the upper bar 202 and the lower bar 204, or two or more support bars 206 extending from the ends of the upper bar 202 and lower bar 204, as shown in FIGS. 4A-C, or between any appropriate locations on the upper bar 202 and the lower bar 204. The human interface 224 may further include a lateral bar or strut 212, as illustrated in FIGS. 4A-C. The system may further include a foldable support structure, such as a folding strut 216 connected to the human interface, to provide additional support to maintain the human interface in an unfolded, operational configuration. The folding strut 216 may fold via a hinge toward the plane of or a plane substantially parallel to that of the mobile platform 132. The system of folding strut 216 may further include a hinge 218 to facilitate the folding of the strut 216 and an additional hinge 222 where the support folding strut 216 connects to the human interface, e.g., at the later bar or strut 212, as illustrated in FIG. 4A. In one aspect, the folding strut 216 may include a pivot or hinge 226 between a proximal strut segment 216*a* and a distal strut segment 216*b* to allow the distal strut segment 216*b* to be moved to abut the proximal strut segment 216*a* in a stored, collapsed position. Another hinge 228 adjacent the mobile platform 132 allows the folding strut 216 to fold to a position in a plane parallel to the plane of the mobile platform 132. The foldable support structure or the folding strut 216 may further include a latching or locking mechanism (not shown) to hold the folding strut in an unfolded operational configuration and/or in a stored, collapsed position. In addition, as shown in FIGS. 4A-C, the upper bar 202 and/or the lower bar 202 may be curved to allow for various distances from the bar to a user, although such curved configuration is not required.

In use, the upper bar 202, lower bar 204, and the lateral bar/strut 212 may be used as grab or hold bars by a user. For example, as illustrated in FIG. 4A, the user may hold the lower bar 204 to assist in ascending a flight of stairs. As illustrated in FIG. 4B, the user may hold the upper bar 202 in descending the flight of stairs. The lateral bar/strut 212 may also be held by the user in any operation of the device. As in the prior embodiment, the human interface 224 may be foldable toward the wall on which the rails are mounted so as to be folded to a substantially flat profile for space saving. As illustrated, the human interface and its supporting structure may pivot to be folded against the mobile platform 132, but any design and foldability are possible. That is, one of the support bars 206 is pivotally connected to the mobile platform 132. As illustrated, the one support bar 206 is attached to the mobile platform 132 via two folding mechanisms 220, of which there may be more or fewer. The details of the folding mechanism(s) 220 are those as may be appreciated by one of skill in the art, and may include a latching or locking mechanism (not shown) for a user to unlatch or unlock the human interface 224 from its folded and/or extended/unfolded operational/travel position for safety and stability of the human interface 224.

In any embodiment, the grab bar (upper, lower or support bar) portion of the human interface 124/224 may include a control switch for turning the system on and off. The control switch as illustrated in FIG. 3B is a push button 186 and it is contemplated that the user must maintain the switch in a closed position to cause an attached motor to operate the device, although such maintaining and placement of the switch may vary. The push button may be placed in a position where it is contemplated that a user would place his/her hand when ascending or descending the stairs. Such a pressure actuated switch, such as a spring-biased push button or slider, provides a safety feature offering quick disengagement of the motor if the user needs the system to stop for any reason, including but not limited to the user being unable to mount the stairs at the pace set by the device or at all.

In addition, in any embodiment, speed of the device may be controlled by a potentiometer 190, or other appropriate speed control, such as a combination of buttons for speed increase or decrease, or a dial, or the like. As illustrated in FIG. 3B, the potentiometer 190 may be controlled by a slider switch, but control of the potentiometer may be by any means that allows up/down control of the potentiometer, and thus speed of the device, such as a rocker switch. Although shown in FIG. 3B being along a lateral strut of the human interface 124, the control switches may be located along the grab bars 178 (e.g., near where the user's hands are shown grabbing the human interface 224 in FIG. 3A or in any other location as may be operated by the user, e.g. upper bar 202, lower bars 204 and/or support bar(s) 206 of human interface 224).

To protect the human user, in any embodiment, a safety belt 128 (see FIG. 1) can be used (looping around the user's back), essentially "tethering" the user to the human interface 124/224 in case s/he loses grip. In the alternative, in any embodiment, a harness system may be used and attached to the human interface 124/224, grab bar, mobile plate or other structure. In another aspect, in any embodiment, the device may include a back brace (not shown) that cantilevers out from the mobile plate and behind a user to prevent the user from falling backwards. The back brace may be foldable toward the mobile plate 118/rack mounted mobile platform 132 Note that the mobile platform 132, fitted with the human interface 224, may be a complete assembled subsystem such that, the power assisted system contemplated herein can be installed with two relatively easy steps: (#1) installing the support rail 114, followed by (#2) attaching the mobile platform 132.

In any embodiment, the human interface 224 and back support system (safety belt 128/harness (not shown)/back brace (not shown)) may be reversible such that the grab bars may flip to face the user to be used in an ascent or a descent position.

The motion powered may be powered by a compact and powerful actuation system including a motor, such as a linear motor (not shown). The motor may be powered by a battery. In an aspect according to principles described herein, the motor and battery are mounted on the mobile platform 118 in such a way that a rotary motion imparted by the motor may cause rotation of the toothed gear to cause the toothed gear to move along the support rail 114 such that movement of the toothed gear with respect to the toothed surface causes the plate 118/mobile platform 132 to move in a desired direction with respect to the upper rail 110 and the support rail 114 to advance the device along the staircase. Other power transmission mechanisms/designs are possible. Additional gears may translate motion from the motor to the toothed gears without departing from the spirit and scope of the principles described herein. In an alternative embodiment, the track in the support rail 114 may move to impart motion to the mobile platform 132 via a mated gear or belt system.

Exemplary Prototype

A prototype according to principles described with respect to FIGS. 1-3 has been designed and fabricated. For the prototype, the design goal was to provide an upward pulling force equivalent to at least 50% of the body weight of a regular male individual (~75 kg), at a speed comparable to or exceeding the average stair climbing speed. Further, commercial off-the-shelf components were used to fabricate the prototype for research purposes. It is contemplated that parts may be fabricated specifically for the device, but is not necessary. Details of the prototypes are shown in FIGS. 1, 2A-B, 3A-B and 4A-C.

In the prototype, the mobile platform 132 was designed to slide (or roll) along the upper rail 110 and the support rail 114. Upward motion of the sliding platform 132 is provided by a tooth-based actuation system. To obtain the desired force capacity, a two-stage configuration was adopted. The first stage was a spur gear set, in which a 12 tooth pinion drove a 72 tooth gear, providing a gear ratio of 6:1. The second stage was a rack-and-pinion mechanism, converting the rotation to the desired linear translation. An 18-tooth pinion (24 teeth/inch diametral pitch) was used in the second stage, providing a pitch radius of 0.375 in. The power source was a permanent-magnet brushless motor (U8-100, T-Motor, Jiangxi, China), providing a maximum torque of 2.29 Nm. Through the gear reduction in the first stage, the torque output was amplified to 13.74 Nm, which was then converted to a normal driving force of 761.80 N. For the speed calculation, the motor maximum speed was 3125 rpm, which is equivalent to 0.492 m/s translation speed for the sliding platform 132. Both the torque and speed capacities exceed the design goals defined above.

The sliding platform 132 of the prototype was supported by a number of rollers that enabled the platform 132 to slide smoothly on the upper rail 110 and the support rail 114. Off-the-shelf rollers with embedded ball bearings were used to simplify the design. Two sets of rollers were used to support the platform 132 on the upper rail 110, as shown in FIGS. 2A and 2B. The roller set design for the support rail 114 was designed to avoid interference with the actuation system. As shown in FIGS. 2A and 2B, three sets of rollers form a supporting mechanism to slide on the lower support rail 114, with each set comprising two rollers separated by a certain distance to avoid the interference with the rack mounted on the support rail 114. This figure also shows more details of the actuation system. As seen in the figures (see lower left figures of FIGS. 2A and 2B), the larger (output) gear of the first stage is connected to the pinion (that engages with the rack) through a rotating shaft. On each side of the pinion, a roller supports the shaft against the support rail 114, and maintain a specific distance from the rail and proper functioning of the rack-and-pinion mechanism.

A motor housing 300 can be seen in FIG. 2A (see figure on the right). A motor and a battery in the prototype were housed within the housing shown. While shown with the motor in a housing in this location, the motor and battery may be placed in appropriate location on or in the mobile platform 132 in a design according to principles described herein in which the track on the support rail 114 is stationary. In a design with a moving track, the motor and battery should be located so as to impart power to the moving rail.

In the prototype, a human interface 124 was constructed using the standard handrail components (tubes and connectors), as shown in FIG. 3A. To provide reliable support to the user, a pair of inclined support tubes were used. Further, the entire assembly was adjustable in the vertical direction to fit users with different heights. The human interface 124 also incorporates a set of control buttons as an intuitive control interface (FIG. 3B). A spring-loaded push-button switch allowed the user to enable the device's upward motion. Holding the button at the "ON" position was required in the prototype to enable the continuous upward motion, which served as a special feature for safety protection. In this configuration, once the button is released, the system/human interface will come to a complete stop immediately, stabilizing the human user with a firm support. While this configuration power control requires constant user activation to cause the mobile platform 132 to move, it is conceivable that constant actuation may not be required.

In the prototype, the control interface also includes a sliding potentiometer for speed control, allowing a user to adjust the upward speed in real time. Both the push-button switch and the sliding potentiometer are thumb operated, enabling a user to grasp the handlebar all the time when operating the device for continuous protection. Positioning of the control interfaces, including the control button and/or the speed controls, may be anywhere on the support tubes to provide easy access to the user.

The materials similar to those used to manufacture the illustrated prototype of FIGS. 1-3 were also used to construct a prototype as illustrated in FIGS. 4A-4B. The functional structures of the mobile platform 132 shown in FIGS. 2A and 2B may be used in conjunction with the human interface 224 of FIGS. 4A-C to provide a power assistive device for stair ascent and descent according to principles described herein.

In addition, features such as sensors may be used to collect data from the operation of the device described herein. For example, the addition of a camera, such as a three dimensional (3D) camera, to collect data about the motion of the user may be informative for adjusting the device and its use.

Compared with the existing devices, the novel assistive device developed in this work, provides stair-climbing assistance in a fundamentally different way. The device is a powered rail-sliding platform 132 that assists its user through a unique human interface. Unlike elevators, stair lifts, or powered wheelchairs, the device does not carry or lift its users upstairs. Instead, it provides powered assistance (a gentle pulling force) and protection (through a safety belt 128) to help users climb stairs in an easier and safer way. Such fundamental change in assistance mode generates two significant advantages. First, the weight and size of the device can be substantially reduced, making it possible to obtain a compact, lightweight, and low-cost assistive device that can be easily installed and deployed in older adults' homes. Such advantage is highly beneficial for promoting the acceptance and adoption of this novel assistive technology in the target population. Second, by assisting the users' stair climbing instead of carrying them upstairs, the device enables and encourages the users to maintain and enhance their stair-climbing capabilities. As stair climbing comes with a high requirement for muscle strength and full-body coordination, it has the potential of becoming a novel and effective mode of physical exercise to keep older adults physically active and improve their mobility. The long-term health benefits may be significant.

While disclosed herein with respect to ascent and descent of stairs, this device may be used for assisting in other motion not involving stairs, for example, walking.

The disclosures of following publications in their entireties are hereby incorporated by reference into this application in order to more fully describe the state of the art to which this invention pertains.

1. Lawler, K., *Aging in Place: Coordinating Housing and Health Care Provision for America's Growing Elderly Population. Cambridge, MA: Joint Center for Housing Studies of Harvard University.* 2001.
2. Cook, C. C., M. H. Yearns, and P. Martin, *Aging in place: Home modifications among rural and urban elderly*. Housing and Society, 2005. 32(1): p. 85-106.
3. Organization, W. H., *Global age friendly cities: A guide.* 2007: World Health Organization.
4. Farber, N., D. Shinkle, J. Lynott, W. Fox-Grage, and R. Harrell, *Aging in place: A state survey of livability policies and practices.* 2011.
5. Startzell, J. K., D. A. Owens, L. M. Mulfinger, and P. R. Cavanagh, *Stair negotiation in older people: a review*. Journal of the American Geriatrics Society, 2000. 48(5): p. 567-580.
6. National Safety Council, *Injury facts*. Itasca, IL: National Safety Council, 2012: p. 29.
7. Hemenway, D., S. J. Solnick, C. Koeck, and J. Kytir, *The incidence of stairway injuries in Austria*. Accident Analysis & Prevention, 1994. 26(5): p. 675-679.
8. Cooper, R. A., M. L. Boninger, R. Cooper, A. R. Dobson, J. Kessler, M. Schmeler, and S. G. Fitzgerald, *Use of the Independence* 3000 *IBOT Transporter at home and in the community*. The journal of spinal cord medicine, 2003. 26(1): p. 79-85.
9. Sugahara, Y., N. Yonezawa, and K. Kosuge. *A novel stair-climbing wheelchair with transformable wheeled four-bar linkages*. in 2010 *IEEE/RSJ International Conference on Intelligent Robots and Systems*. 2010. IEEE.
10. Quaglia, G., W. Franco, and R. Oderio, *Wheelchair. q, a motorized wheelchair with stair climbing ability*. Mechanism and Machine Theory, 2011. 46(11): p. 1601-1609.
11. Scewo AG. Scewo. Available from: https://scewo.ch/en/.
12. EZ-STEP. *Portable, unique, one of a kind stair climbing aid!;* Available from: https://www.ez-step.com/home.html.
13. StairSteady. A Step Towards Independence. [cited 2020 Apr. 3]; Available from: https://staristeady.net/.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A device for assisting a user in motion in a system comprising at least an upper rail and a support rail parallel to the upper rail, the device comprising:

a mobile platform;

a first engagement mechanism attached to the mobile platform and having at least one contact means for contacting a top surface of the upper rail, wherein the first engagement mechanism is above the upper rail when the at least one contact means of the first engagement mechanism contacts the top surface of the upper rail;

a second engagement mechanism attached to the mobile platform having a contact means having a surface complementary to a driving surface of the support rail, wherein the driving surface of the support rail is a top surface of the support rail, and further wherein the second engagement mechanism is above the support rail when the contact means of the second engagement mechanism contacts the driving surface of the support rail;

a human interface for grasping by the user; and a motor for causing relative motion of the contact means with respect to the driving surface, wherein the human interface comprises an upper bar for holding by the user when descending a flight of stairs and a lower bar for holding by the user when ascending the flight of stairs.

2. The device of claim 1, further comprising an actuation switch on the human interface for activation by the user to cause the motor to operate.

3. The device of claim 1, wherein the first engagement mechanism comprises at least one roller for contacting a surface of the upper rail, such that the roller rolls in a predetermined direction upon actuation of the motor.

4. The device of claim 3, wherein the first engagement mechanism further comprises a bracket housing the at least one roller.

5. The device of claim 4, wherein the bracket comprises a lateral arm and a distal arm and a second roller mounted in the distal arm and abutting a surface of the upper rail different from the surface of the upper rail contacted by the at least one roller.

6. The device of claim 1, wherein the second engagement mechanism comprises a cylindrical gear having a surface complementary to the driving surface.

7. The device of claim 6, the second engagement mechanism including a wheel for abutting and rolling along a portion of the support rail.

8. The device of claim 1, wherein the second engagement mechanism includes an axle having mounted thereon at least one wheel and at least one toothed gear comprising teeth, the teeth complementary to a linear toothed surface of the support rail.

9. The device of claim 8, further comprising a transmission comprising a first gear driven by the motor, and a second gear for driving the axle, the second gear in toothed engagement with the first gear.

10. The device of claim 1, wherein the second engagement mechanism further comprises a wheel having a surface complementary to the driving surface, the wheel for abutting a surface of the support rail.

11. The device of claim 1, further comprising a speed control on the human interface.

12. The device of claim 1, further comprising a foldable support structure attaching the human interface to the mobile platform.

13. The device of claim 12, wherein the foldable support structure comprises a folding strut and a hinge.

14. The device of claim 13, wherein the folding strut comprises a distal strut segment and a proximal strut segment with another hinge therebetween.

15. The device of claim 1, wherein the human interface comprises a speed controller.

16. The device of claim 1, wherein the second engagement mechanism comprises: a tooth-based actuation system.

17. The device of claim 16, wherein the tooth-based actuation system comprises a first stage having a spur gear set and a second stage comprising a rack-and-pinion for converting a rotation to a linear translation.

18. The device of claim 1, wherein the motor is a permanent magnet brushless motor.

19. The device of claim 1, wherein the human interface comprises a back brace that prevents the user from falling backwards.

20. The device of claim 1, wherein the human interface comprises a safety belt that tethers the user to the human interface.

* * * * *